United States Patent [19]
Hassan et al.

[11] Patent Number: 5,621,417
[45] Date of Patent: Apr. 15, 1997

[54] METHOD AND MECHANISM FOR REDUCTION OF WITHIN-TRAIN REPORTED DATA

[75] Inventors: Amer A. Hassan, Cary, N.C.; John E. Hershey, Ballston Lake, N.Y.

[73] Assignee: General Electric Company, Schenectady, N.Y.

[21] Appl. No.: 484,754

[22] Filed: Jun. 7, 1995

[51] Int. Cl.$^6$ ..................................................... G01S 3/02
[52] U.S. Cl. ............................................. 342/457; 342/463
[58] Field of Search ................................. 342/457, 463, 342/464, 465

[56] References Cited

U.S. PATENT DOCUMENTS

| | | | |
|---|---|---|---|
| 3,928,852 | 12/1975 | Barker | 343/105 R |
| 4,087,816 | 5/1978 | Barszczewski et al. | 343/105 R |
| 4,186,397 | 1/1980 | Sternberger et al. | 343/7.5 |
| 4,494,119 | 1/1985 | Wimbush | 343/457 |
| 4,651,156 | 3/1987 | Martinez | 342/457 |
| 4,774,518 | 9/1988 | Fukuhara | 342/389 |
| 5,045,861 | 9/1991 | Duffett-Smith | 342/457 |
| 5,225,842 | 7/1993 | Brown et al. | 342/357 |
| 5,379,224 | 1/1995 | Brown et al. | 364/449 |

*Primary Examiner*—Thomas H. Tarcza
*Assistant Examiner*—Dao L. Phan
*Attorney, Agent, or Firm*—Marvin Snyder

[57] ABSTRACT

A tracking system for railcars is configured as a dynamic local area network having a master tracking unit and a plurality of slave tracking units, each tracking unit being affixed to a separate railcar. To improve reliability of communications between railcars, the distance from a master unit to a slave unit is estimated by comparing phase of a transmitted signal with that of the transmitted signal returned by another tracking unit in the network. Optionally, a determination is made as to whether the slave unit is "ahead" of or "behind" the master unit. Communication path loss between the master and slave units due to frequency selective fading may also be determined. A spectrum survey determines quality of the channel as to its capacity for passing data from the slave unit to the master unit.

7 Claims, 6 Drawing Sheets

METHOD AND MECHANISM FOR REDUCTION OF WITHIN-TRAIN REPORTED DATA

BACKGROUND OF THE INVENTION

1. Field of the Invention

This present invention relates to tracking of assets, such as railcars and their cargos, using the Global Positioning System (GPS) and, more particularly, to a method and apparatus for reducing data transmitted between railcars of a train without going through a transponder.

2. Description of the Prior Art

Goods shipped from a manufacturing plant, warehouse or port of entry to a destination are normally required to be tracked to assure their timely and safe delivery. Tracking has heretofore been accomplished in part by use of shipping documents and negotiable instruments, some of which travel with the goods and others of which are transmitted by post or courier to a receiving destination. This paper tracking provides a record which is completed only on the safe delivery and acceptance of the goods. However, there sometimes is a need to know the location of the goods while in transit. Knowledge of the location of the goods can be used for inventory control, scheduling and monitoring.

Shippers have provided information on the location of goods by tracking their vehicles, knowing what goods are loaded on those vehicles. Goods are often loaded aboard shipping containers or container trucks, for example, which are in turn loaded aboard railcars. Various devices have been used to track such railcars. For example, passive radio frequency (RF) transponders mounted on the cars have been used to interrogate each car as it passes a way station and supply each car's identification (ID). This information is then transmitted by a radiated signal or land line to a central station which tracks the locations of the cars. This technique, however, is deficient in that any railcar on a siding cannot pass a way station until it has left the siding. Moreover, way station installations are is expensive, requiring a compromise that results in way stations being installed at varying distances, depending on the track layout. Thus, the precision of location information varies from place to place on the railroad.

Recently, mobile tracking units have been used for tracking various types of vehicles, such as trains. Communication has been provided by means of cellular mobile telephone or RF radio link. Such mobile tracking units are generally installed aboard the locomotive which provides a ready source of power. However, in the case of shipping containers, container truck trailers and railcars, a similar source of power is not readily available. Mobile tracking units which might be attached to containers and vehicles must be power efficient in order to provide reliable and economical operation. Typically, a mobile tracking unit includes a navigation set, such as a Global Positioning System (GPS) receiver or other suitable navigation set, responsive to navigation signals transmitted by a set of navigation stations which may be either space-based or earth-based. In each case, the navigation set is capable of providing data indicative of the vehicle location based on the navigation signals. In addition, the mobile tracking unit may include a suitable electromagnetic emitter for transmitting to a remote location the vehicle location data and other data acquired from sensing elements on board the vehicle. Current methods of asset localization require that each item tracked be individually equipped with hardware which determines and reports location to a central station. In this way, a tracked asset is completely "ignorant" of other assets being shipped or their possible relation to itself. In reporting to the central station, such system requires a time-bandwidth product which scales approximately with the number of assets being reported. The aggregate power consumption over an entire such system also scales with the number of assets tracked. Further, since both the navigation set and the emitter are devices which, when energized, generally require a large portion of the overall electrical power consumed by the mobile tracking unit, it is desirable to control the respective rates at which such devices are respectively activated and limit their respective duty cycles so as to minimize the overall power consumption of the mobile tracking unit.

In order for a network of mobile tracking units to operate reliably, it is desirable to know the distance between a "master" tracking unit and each of the remaining tracking units in the network, which may be considered to be "slave" tracking units, and also whether a slave tracking unit is ahead of or behind the master tracking unit; that is, whether the slave tracking unit is closer to, or farther away from, the front locomotive in the direction of train movement. There is also a need to determine the individual communication path losses from the master tracking unit to individual slave tracking units and to determine the quality of the channel as to its capacity for passing data between the master and the slave tracking units. The function of master tracking unit is assigned to a specific tracking unit according to a protocol within the network.

SUMMARY OF THE INVENTION

One object of the invention is to facilitate communications between railroad cars without going through a transponder, such as a satellite or central station.

Another object of the invention is to provide an asset tracking system configured as a dynamic local area network having a master tracking unit and a plurality of slave tracking units wherein a relative location and distance from each slave tracking unit to the master tracking unit is determined.

Another object of the invention to provide an asset tracking system wherein the quality of a communications channel and its capacity for passing data between a master tracking unit and each of a slave tracking units is determinable.

In accordance with the invention, a mobile local area network (LAN) is established among a plurality of asset tracking units in close proximity. Assets are approximately located by way of their connection in the mobile LAN where the exact location of at least one network node is known. Each tracked asset has the capability to independently determine and report its location to a central station, and each asset also has the capability to communicate locally with other cooperative assets via the LAN. Because of the inherent mobility of the tracked assets, the LAN is a wireless network preferably using low power spread spectrum transceivers. The LAN is dynamically reconfigurable so that as other cooperative assets come into proximity, they can join the network, and as others leave, they can exit the network.

Within the network, a protocol is established which assigns one of the assets to be the "master" asset and all others to be "slave" assets. The master asset takes the responsibility of determining its own exact geographical position. This may be done via LORAN, OMEGA, Global Positioning System (GPS) or other navigational aid. When connected in a LAN, slave assets simply report their identification (ID) to the master asset according to the local protocol and do not determine their own location in order to conserve power. The master asset reports to the central station its location and ID, as well as the ID of each of the other assets in the LAN. The central station can then know that the assets associated with each ID are within the commnunication range of the geographical position reported by the master. Uncertainty in the location of a slave asset is limited by the known possible geographical extent of the LAN, which is known a priori.

In one preferred embodiment of the invention, a railcar location and tracking system comprises independent mobile tracking units affixed to railroad freight cars. These tracking units are battery powered and have GPS receiving and communication transmitting capabilities. The tracking units have an extremely low power radio data link between units (on the freight cars) which are in close proximity (about 1 km). This radio link allows tracking units which are part of the same train to share information, thereby allowing use of a single GPS receiver and a single communications transmitter. Since the GPS receiving and communications transmitting functions are the most power consumptive tasks performed by the tracking units, this sharing of information reduces the average power consumed by the tracking units in the train. System reliability is significantly enhanced by allowing tracking units with inoperative GPS receivers or communications transmitters to continue to provide location and tracking information through the local communications network. In order to even further improve the reliability of the communications that take place between railroad cars, the distance from a master tracking unit to a slave tracking unit is estimated. Optionally, a determination is made as to whether the slave unit is "ahead" of or "behind" the master unit, these terms being used to specify the relative position determined by nearness to the front locomotive or train direction of movement. Additionally, a way is provided to estimate the communication path loss between the master unit and the slave units. A spectrum survey is also performed to determine quality of the channel as to its capacity for passing data between the master unit and the slave units.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF A PREFERRED EMBODIMENT OF THE INVENTION

Figure 1:
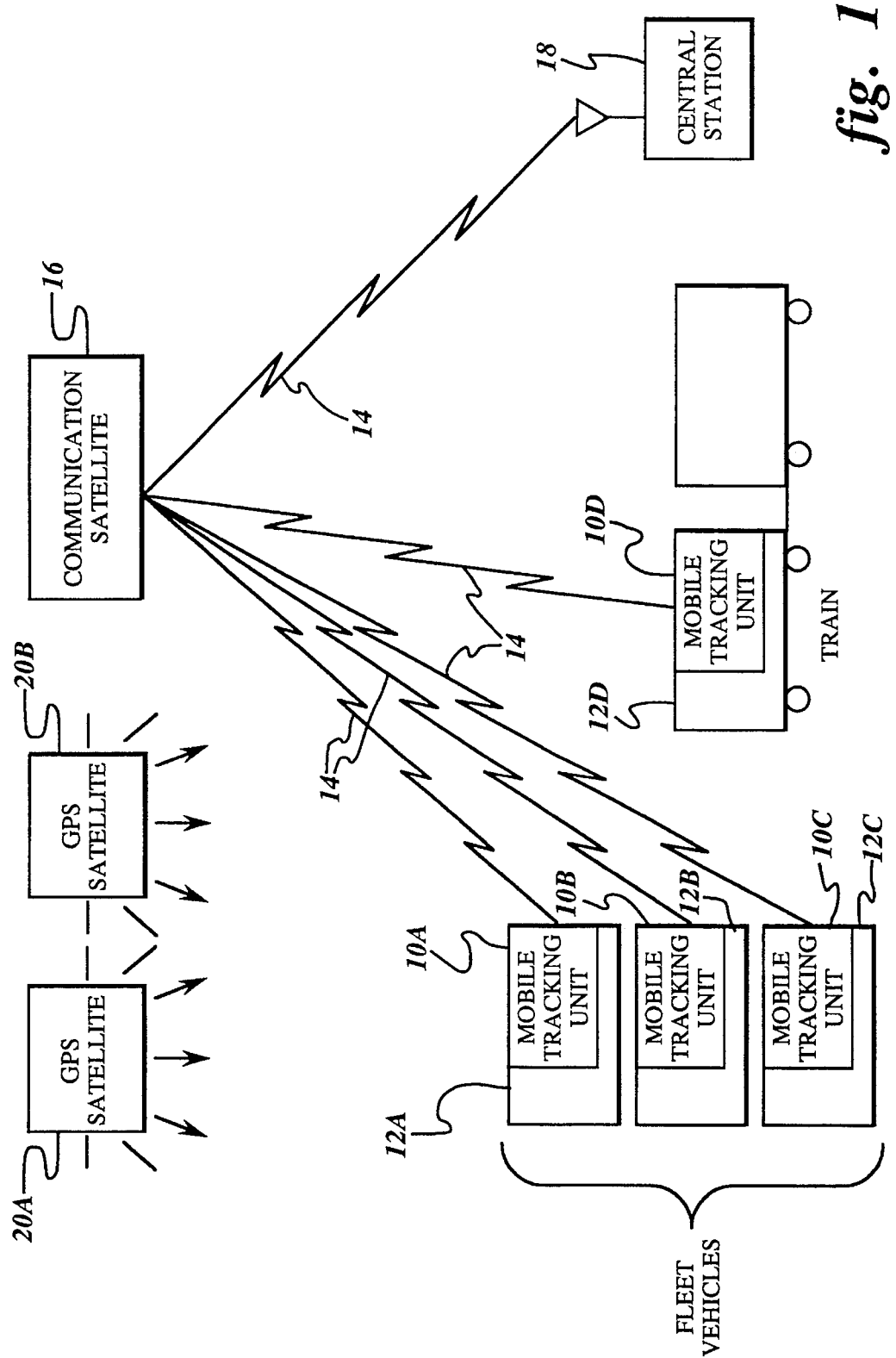
FIG. 1 is a block diagram of an exemplary asset tracking system which employs independent mobile tracking units in accordance with the present invention.

FIG. 1 illustrates mobile tracking units which employ navigation signals from a GPS satellite constellation, although, as suggested above, other navigation systems can be used in lieu of GPS. A set of mobile tracking units 10A–10D are installed in respective cargo-carrying conveyances, such as vehicles 12A–12D, which are to be tracked or monitored. A multiple communication link 14, such as a satellite communication link through a communication satellite 16, can be provided between each mobile tracking unit (hereinafter collectively designated as 10) and a remote central station 18 manned by one or more operators and having suitable display devices and the like for displaying location and status information for each vehicle equipped with a respective mobile tracking unit. Communication link 14 can be conveniently used for transmitting vehicle conditions or events measured with suitable sensing elements. A constellation of GPS satellites, such as GPS satellites 20A and 20B, provides highly accurate navigation signals which can be used to determine vehicle location and velocity when the signals are acquired by a suitable GPS receiver.

Briefly, the GPS was developed by the U.S. Department of Defense and gradually placed into service throughout the 1980s. The GPS satellites constantly transmit radio signals in L-Band frequency using direct sequence spread spectrum techniques. The transmitted radio signals carry pseudo-random sequences which allow users to determine location on the surface of the earth (within approximately 100 ft), velocity (within about 0.1 MPH), and precise time information. GPS is a particularly attractive navigation system to employ, being that the respective orbits of the GPS satellites are chosen so as to provide substantially world-wide coverage and being that such highly-accurate radio signals are provided free of charge to users by the U.S. government.

Figure 2:
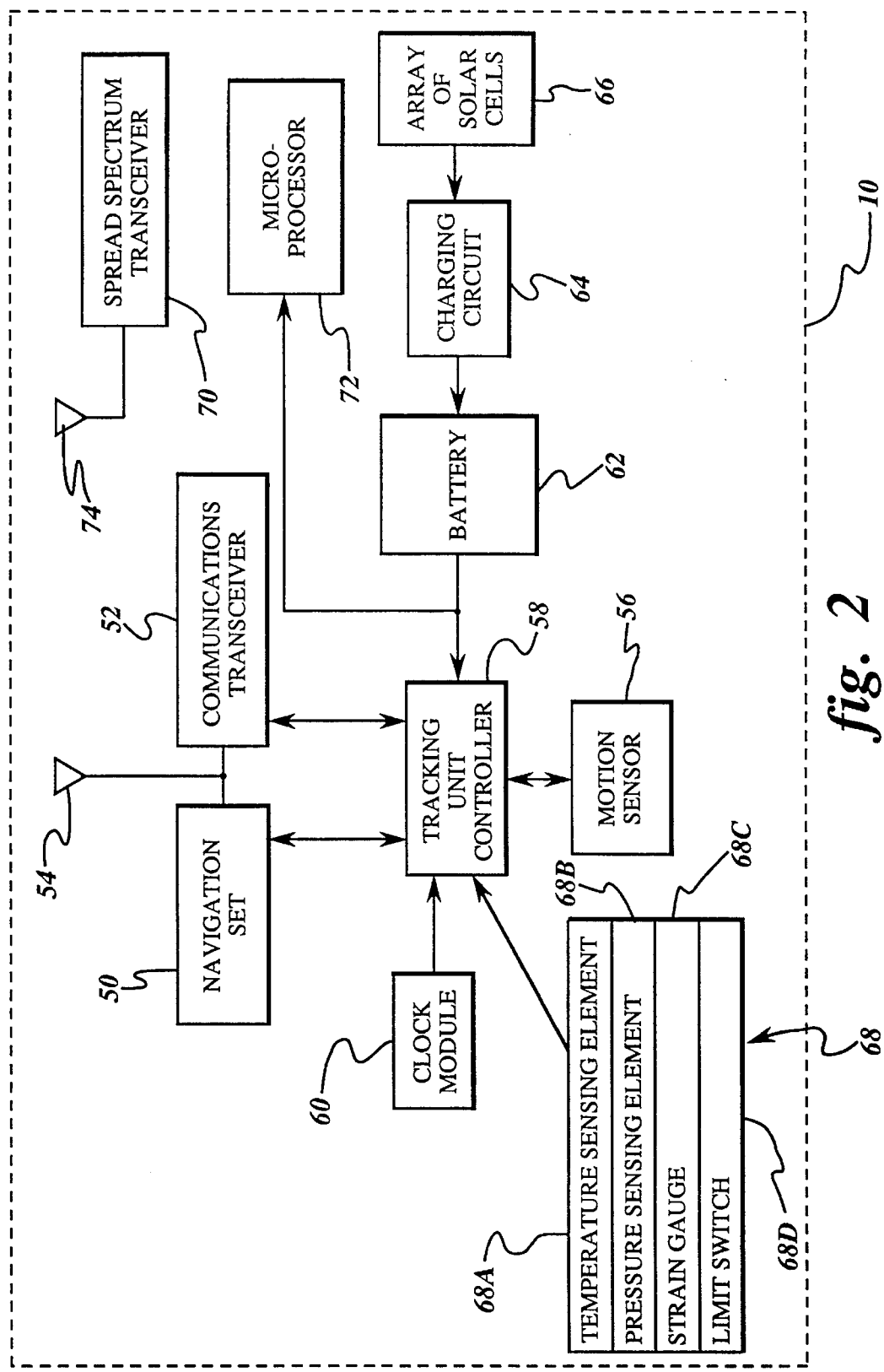
FIG. 2 is a block diagram showing in further detail a mobile tracking unit as used in the tracking system shown in FIG. 1.

FIG. 2 is a block diagram of a mobile tracking unit 10 which includes a navigation set 50 capable of generating data substantially corresponding to the vehicle location. Choice of navigation set depends on the particular navigation system used for supplying navigation signals to any given mobile tracking unit. Preferably, the navigation set is a GPS receiver such as a multichannel receiver; however, other receivers designed for acquiring signals from a corresponding navigation system may alternatively be employed. For example, depending on the vehicle location accuracy requirements, the navigation set may comprise a Loran-C receiver or other such less highly-accurate navigation receiver than a GPS receiver. Further, the navigation set may conveniently comprise a transceiver that inherently provides two-way commununication with the central station and avoids the need for separately operating an additional component to implement such two-way communication. Briefly, such transceiver would allow for implementation of satellite range measurement techniques whereby vehicle location is determined at the central station by range measurements to the vehicle and the central station from two satellites whose position in space is known. The need for power by either such navigation set imposes a severe constraint for reliable and economical operation of the mobile tracking unit aboard vehicles which typically do not carry power supplies (e.g., shipping containers, railcars used for carrying freight, truck trailers, etc.). For example, typical GPS receivers currently available generally require as much as 2 watts of electrical power for operation. For the GPS receiver to location fix, it must be energized for some minimum period of time in order to acquire sufficient signal information from a given set of GPS satellites so as to generate a navigation solution. A key advantage of the present invention is the ability to substantially reduce the energy consumed by the mobile tracking unit by selectively reducing the activation or usage rate for the navigation set and other components of the mobile tracking unit. In particular, if, while the vehicle is stationary, the activation rate for the navigation set is reduced, then the energy consumed by the mobile tracking unit can be substantially reduced, for example, by a factor of at least 100.

Mobile tracking unit 10 includes a communications transceiver 52 functionally independent from navigation set 50. If the navigation set comprises a transceiver, the function of transceiver 52 can be performed by the transceiver of navigation set 50. Both communications transceiver 52 and navigation set 50 are actuated by a controller 58, which receives clock signals from a clock module 60. Transceiver 52 is capable of transmitting the vehicle location data by way of communication link 14 (FIG. 1) to the central station and receiving commands from the central station by way of the same link. If a GPS receiver is used, the GPS receiver and the transceiver can be conveniently integrated as a single unit for maximizing efficiency of installation and operation. An example of one such integrated unit is the Galaxy InmarsatC/GPS integrated unit, which is available from Trimble Navigation, Sunnyvale, Calif., and which is conveniently designed for data communication and position reporting between the central station and the mobile tracking unit. A single, low profile antenna 54 can be used for both GPS signal acquisition and satellite communication.

A low power, short distance radio link permits joining in a network the tracking units of a train to minimize power and maintain high reliability and functionality of such network. As shown in FIG. 2, in addition to a power source 62 (which comprises a battery pack that can be charged by an array of solar cells 66 through a charging circuit 64), a GPS receiver 50, a communications transceiver 52, and various system and vehicle sensors 68A–68D, each tracking unit includes a low power local transceiver 70 and a microprocessor 72. Microprocessor 72 is interfaced to all of the other elements of the tracking unit and has control over them. Transceiver 70 may be a commercially available spread spectrum transceiver such as those currently utilized in wireless local area networks. Spread spectrum transceiver 70 is equipped with its own low profile antenna 74.

Figure 3:
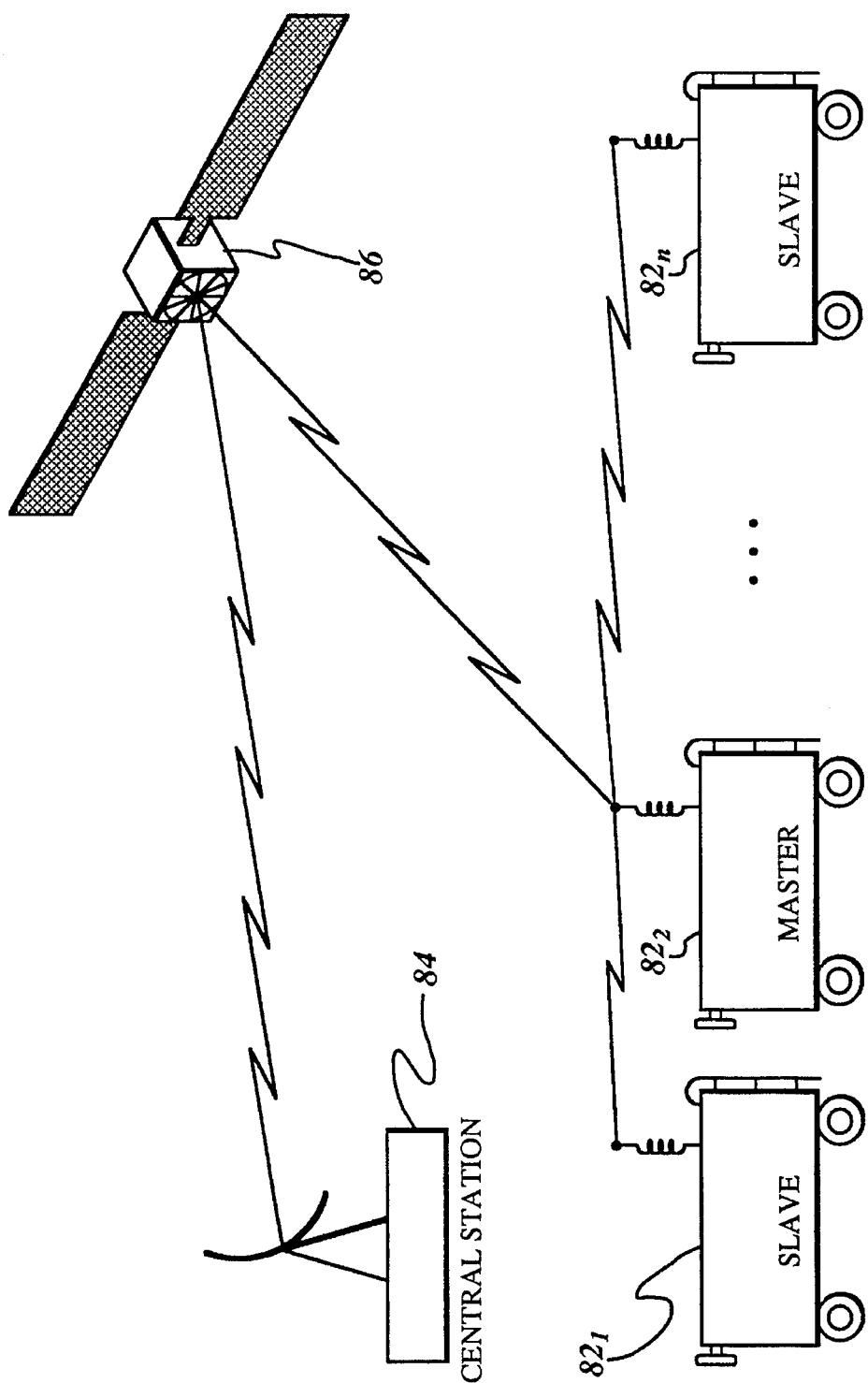
FIG. 3 is a block diagram illustrating organization of the mobile local area network in which mobile tracking units are employed.

Utilizing local transceiver 70, microprocessor 72 communicates with all other tracking units within communications range, forming a dynamically configured local area network (LAN), hereinafter designated a "mutter network", while the tracking units of the network are designated "mutter" mode tracking units. Such mutter network is generally shown in FIG. 3. When a train has multiple freight cars $82_1, 82_2, \ldots, 82_n$ equipped with tracking units of the type shown in FIG. 3, all of these units will exchange information. The exchanged information will allow these units to recognize that they are all included on the same train. Because each microprocessor is interfaced to the power source of its own respective tracking unit, the status of available power for each tracking unit can also be exchanged. Once this information is available, then the tracking unit with the most available power (i.e., most fully charged batteries) will become the designated master, the other tracking units being slaves. The master tracking unit performs the GPS location and velocity reception and processing function, assembles these data along with the identification (IDs) of all other tracking units on the train, and transmits this information periodically in a single packet to a central station 84 via communication satellite 86.

Because one GPS receiver among all of the tracking units is turned on at a time (as well as only one communications transceiver), total system power is minimized. Moreover, this function also increases the reliability of each tracking unit because it automatically reduces the power consumed by a unit which has a degraded or partially functional power source. Thus, while a unit with weak batteries cannot perform the GPS receiving or information transmitting and command receiving functions, which are the most power consuming functions in the tracking unit, a tracking unit with damaged solar cells or a battery which cannot hold a full charge can still be fully functional when it is part of a train with fully functional tracking units.

Figure 4:
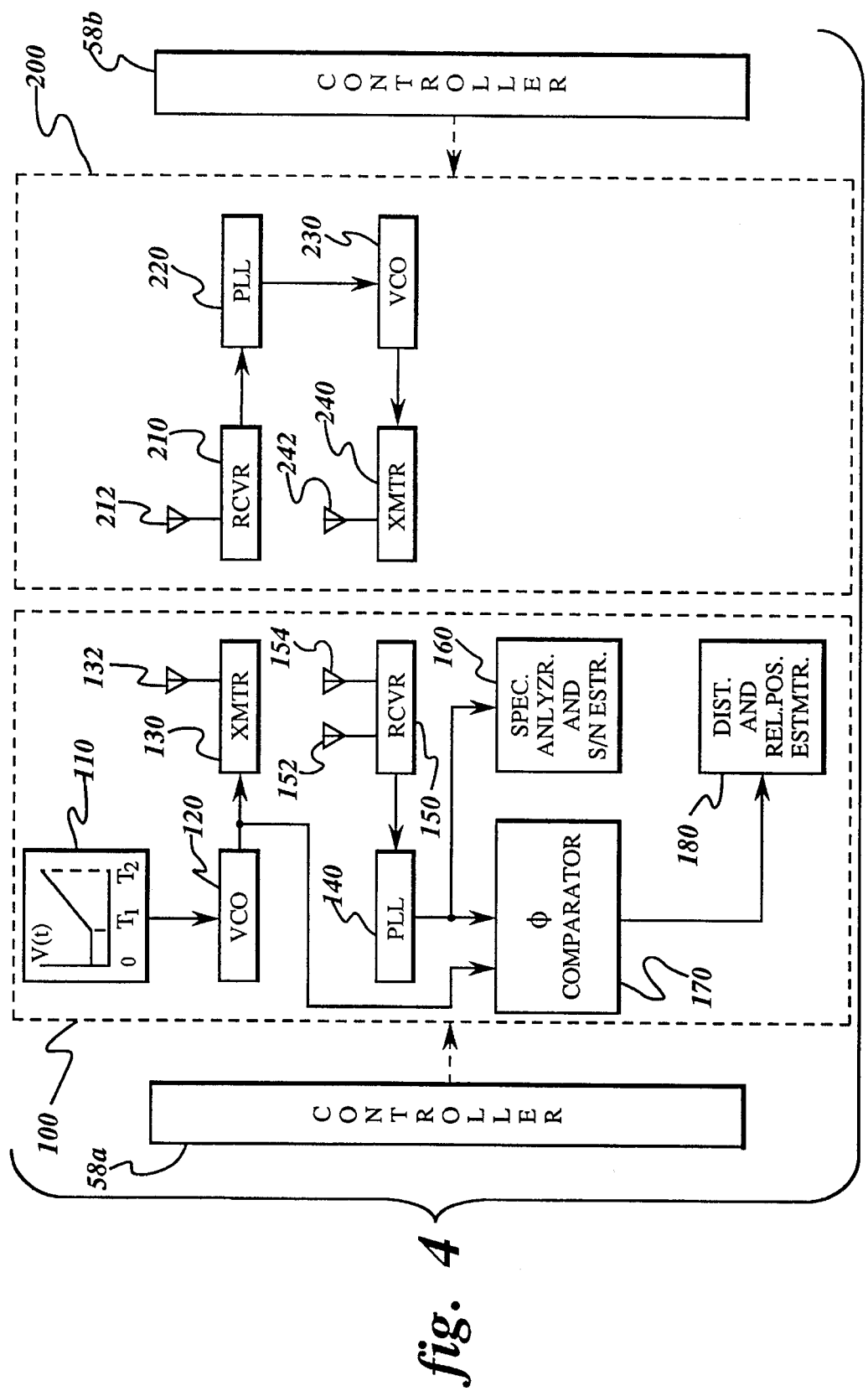
FIG. 4 is a block diagram of apparatus for performing distance and orientation measurement/channel characterization according to the present invention.

FIG. 4 is a block diagram of apparatus for performing distance and orientation measurements and channel characterization. The tracking unit controller 58a of the mutter mode master tracking unit is an interface to the rest of the mutter mode master tracking unit and is responsible for initiating and sequencing the operations for the mutter mode master tracking unit apparatus 100. Similarly, the tracking unit controller 58b of a slave tracking unit is responsible for initiating and sequencing the operations for a mutter mode slave tracking unit 200. Controllers 58a and 58b are interfaces to the rest of the mutter mode master and slave tracking units equipment, respectively.

A waveform generator 110 provides a voltage waveform to a voltage controlled oscillator (VCO) 120. The waveform is a constant voltage for the interval $0 \leq t \leq T_1$ and is an increasing linear ramp during the interval $T_1 \leq t \leq T_2$. The output signal of VCO 120 is a constant frequency in the interval $0 \leq t \leq T_1$ and a linearly increasing frequency in the interval $T_1 \leq t \leq T_2$. The VCO output signal is considered to be the baseband signal and modulates a transmitter 130 operating at a carrier frequency $f_1$ and which emits its signal through an antenna 132.

The signal from master unit transmitter 130 is received at the slave unit by a receiver 210 from an antenna 212. The received signal is converted to baseband by receiver 210, which detects and identifies the signal in the interval $0 \leq t \leq T_1$ by a constant frequency sine wave signal. The baseband signal is supplied to a phase locked loop (PLL) 220 which tracks the sine wave signal as it increases in frequency over the interval $T_1 \leq t \leq T_2$. The PLL 220 drives a VCO 230 which generates a near replica of the sine wave baseband signal. The output signal of VCO 230, which is the baseband signal, is supplied at a carrier frequency $f_2$ from an antenna 242.

The signal transmitted by slave unit 200 is received at the master tracking unit on two antennas 152 and 154. These antennas are separated by an appropriate baseline parallel to the nominal line of the train. The mutter network master unit receiver 150 demodulates the received signal to baseband using the signal received from antenna 152. The baseband time varying sine wave signal is tracked by a PLL 140. The output signal of PLL 140 is applied to a spectrum analyzer and signal-to-noise (S/N) estimator 160, which estimates the channel quality using the variance of the PLL 140 output signal; that is, the greater the signal variance in a sliding loop bandwidth window, the greater the interference in the window at that point in the spectrum. The output signal of PLL 140 is also supplied to a phase comparator 170 along with the output signal (i.e., reference phase) generated by VCO 120. Phase comparator unit 170 reports relative phase versus time to a distance and relative position estimator 180, which computes the rate of change of phase $\phi$ to angular frequency $\omega = 2f$, or $d\phi/d\omega$, and uses this quantity to estimate the distance between the mutter mode master tracking unit and the particular mutter mode slave tracking unit in communication therewith. The procedure fro the signal received on antenna 154 is the same as for the signal received on antenna 152. Distance and relative position estimator 180 determines if the particular mutter mode slave station is "ahead" or "behind" based on a comparison of the relative rates of change of phase and angular frequency supplied by compartor 170.

Figure 5:
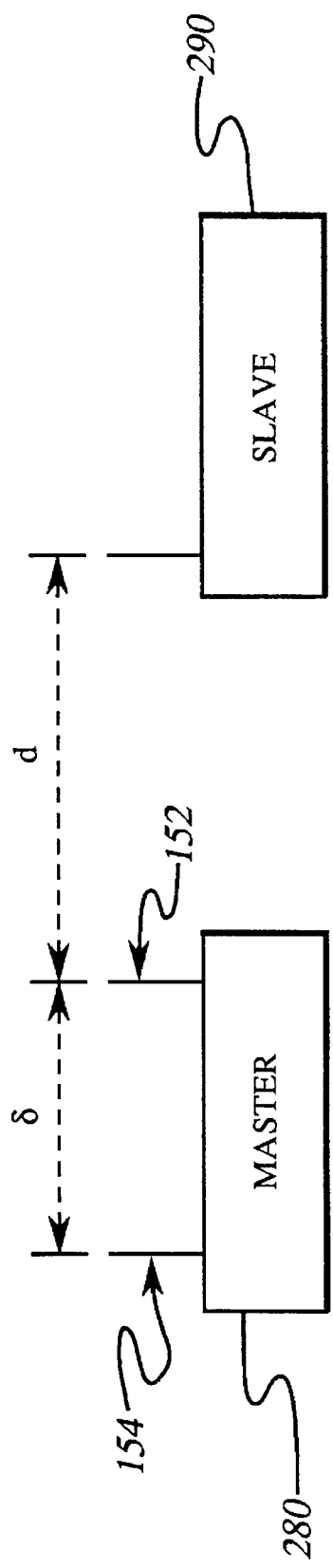
FIG. 5 is a generalized block diagram illustrating the nature of a problem solved by the invention.

FIG. 5, which illustrates a problem solved by this invention, shows a master tracking unit 280 separated from a slave tracking unit 290 by a distance d. Assume that master unit antennas 152 and 154 are used to both transmit and receive although, alternatively, the master unit may employ separate transmit and receive antennas. The master unit antenna sites are shown in FIG. 5 as being separated by a distance δ. Assume that the master unit transmits a single tone baseband signal, sin (ωt), from antenna 152. The master unit receives the "turned around" signal from the slave unit at antenna 152, which may be expressed as sin (ω(t−2d/c)), where c is the speed of light. Distance d may be estimated by computing $$d = -\frac{c}{2} \frac{d\phi}{d\omega},$$

where ϕ is the phase of the received "turned around" signal at baseband. By making the same calculation for (d+δ) and using antenna 154, whether antenna 154 is closer to slave unit 290 than antenna 152 (in which case δ is a negative quantity), or father away, becomes readily apparent.

Figure 6:
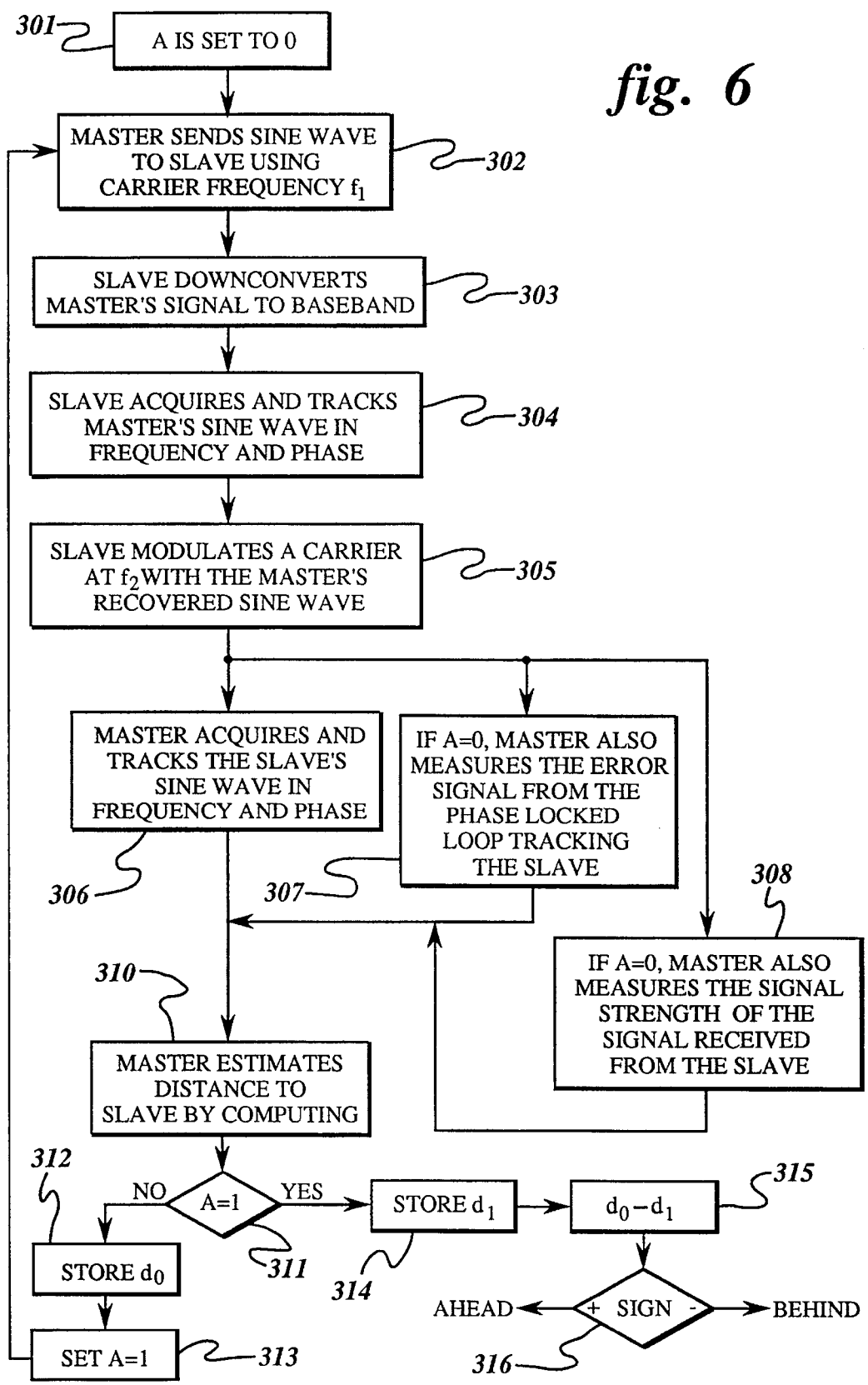
FIG. 6 is a flow diagram illustrating the processing logic performed by a preferred embodiment of the invention.

The flow diagram of FIG. 6 illustrates the measurement processes performed by the invention. At the beginning of the process, A, which represents the master unit antennas, is initially set to zero at step 301. Assume A is encoded as zero for antenna 152 and one for antenna 154. A loop is entered at step 302 where the master unit sends a sine wave signal to the slave unit on a carrier frequency $f_1$. The slave unit downconverts the received master unit signal to baseband at step 303. The slave unit then acquires and tracks the master unit sine wave signal in frequency and phase at step 304. The slave unit modulates a carrier of frequency $f_2$ with the recovered master sine wave signal at step 305 and transmits it to the master unit. At step 306, the master unit acquires the sine wave signal transmitted by the slave unit and tracks that signal in frequency and phase. If A is zero, that is, the receiving antenna is 152, then the master unit also measures the error signal from the phase locked loop tracking the slave transmitted sine wave signal at step 307. Also, if A is zero, the master unit measures the strength of the signal received from the slave unit at step 308 and estimates the distance d using the formula above, at step 310. A test is next made at decision step 311 to determine if A is set to one. If A is set to zero, the computed distance is stored as $d_0$ at step 312 for the estimated distance using antenna 152. A is then set to one at step 313, and the process loops back to step 302 where the process is repeated but using antenna 154. This time through the process, however, the measurements made at steps 307 and 308 are not made. After the second time through the loop, the process goes from decision step 311 to step 314 where the distance computed at step 310 is stored as $d_1$, the estimated distance (d+δ) using antenna 154. Then, at step 315, $d_1$ is subtracted from $d_0$. A test is made at decision step 316 to determine if the sign of the difference of $d_0$ and $d_1$ is positive or negative. If positive, the slave unit is ahead of the master unit if the direction of travel in FIG. 5 is assumed to be right to left; otherwise, the slave unit is behind the master unit.

The master unit measures the strength of the signal received from the slave unit by passing the received signal through a very narrow bandpass filter centered on the returned tone. The power in that narrow bandwidth is used to estimate the communication path loss due to frequency selective fading. Combined with the signal strength measurement, the error signal from the phase locked loop tracking the slave unit is used to estimate the interference in the channel.

The master unit performs a spectrum survey of the signal from the slave unit by varying its sine wave signal frequency in a linear manner over some range and measures the slave unit's transmitted sine wave signal phase. A method by which interference may be estimated is as follows, using symbols and results developed by Alain Blanchard, Phase-Locked Loops, John Wiley & Sons (1976). Let H(jω) be the general linearized transfer function of the phase-locked loop, and ϕ(t) be the output of the PLL when excited by a signal $y_i(t) = A\sin(\omega t + \theta_i) + n(t)$, where n(t) is white and Gaussian noise and A here is the amplitude of the sine wave component of $y_i(t)$. Then, for a first order PLL, $$H(j\omega) = \frac{K}{j\omega + K},$$

and $$\sigma_{\phi_0}^2 = \frac{N_0}{a^2} \frac{K}{2}$$

where K is the parameter defining the PLL filter and $N_0$ is the power spectral density of the noise. $N_0$ can be estimated by first estimating A and knowing K. To resolve ambiguities between interference in the link from master unit-to-slave unit and the link from slave unit-to-master unit, a slightly different band of frequencies can be swept when the distance measurements are made using antennas 152 and 154 (FIG. 5), allowing use of both sets of information to resolve the frequency/frequency range of the interference.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A method of tracking assets comprising the steps of:

affixing a tracking unit to each asset to be tracked;

establishing a mobile local area network of tracked assets between a plurality of tracking units in close proximity, each of said tracking units constituting a node of the mobile local area network;

establishing a master tracking unit among tracking units in the mobile local area network, all other tracking units in the mobile local area network being slave tracking units; and approximately locating each one of the slave tracking units in the mobile local area network with respect to the master tracking unit by transmitting a tone signal from the master tracking unit to each one of the slave units, tracking a returned tone signal from each one of the slave units respectively, and measuring a distance between the master tracking unit and each one of the slave units, respectively, as a phase difference in transmitted and returned tone signals, respectively.

2. The method recited in claim 1 wherein the step of approximately locating each one of the slave tracking units includes the steps of:

determining distance of each one of the slave tracking units from the master tracking unit; and determining relative location of said each one of the slave tracking units with respect to the master tracking unit as a function of a direction of travel.

3. The method recited in claim 1 wherein the tone signal transmitted from the master tracking unit is $\sin(\omega t)$, where $\omega = 2\pi f$ and f is the frequency of the tone signal, and the step of approximately locating each one of the slave tracking units is calculated as a distance d from the master tracking unit as $$d = -\frac{c}{2} \frac{d\phi}{d\omega},$$

where $\phi$ is the phase of the returned tone signal from said each one of the slave tracking units and c is the speed of light.

4. The method recited in claim 3 further comprising the step of determining relative location of said each one of the slave tracking units with respect to the master unit as a function of a direction of travel.

5. The method recited in claim 4 wherein the step of determining relative location of said each one of the slave tracking units comprises the steps of:

transmitting a first tone signal by said master tracking unit and receiving a return of said first tone signal at a first antenna of said master tracking unit;

computing a first distance $d_0$ based on a return to said master tracking unit of said first tone signal by said each one of the slave tracking units;

transmitting a second tone signal by said master tracking unit and receiving a return of said second tone signal at a second antenna of said master tracking unit;

computing a second distance $d_1$ based on a return to said master tracking unit of said second tone signal by said each one of the slave tracking units, said first and second antennas being separated from one another by a predetermined distance along a line passing through the master tracking unit and the slave tracking unit;

subtracting the first distance from the second distance; and determining relative location of said each one of the slave tracking units as a function of the sign of the difference between the first and second distances.

6. The method of tracking assets recited in claim 1 further comprising the steps of:

estimating at the master tracking unit a communication path loss between the master tracking unit and said each one of the slave tracking units; and performing a spectrum survey at the master tracking unit to characterize interference between the master tracking unit and each one of the slave tracking units.

7. The method of tracking assets recited in claim 6 wherein the step of estimating a communication path loss comprises the step of measuring signal strength of the tone signal returned by each one of the slave tracking units.

* * * * *